United States Patent [19]

Sherman et al.

[11] Patent Number: 6,031,625

[45] Date of Patent: Feb. 29, 2000

[54] SYSTEM FOR DATA EXTRACTION FROM A PRINT DATA STREAM

[75] Inventors: Steven P. Sherman, Oakland; Chongshi Xu, Fremont; Torben Moller, Berkeley; Hui-Tsung Liang, San Francisco; Paul Feng, Hayward, all of Calif.

[73] Assignee: Alysis Technologies, Inc., Emeryville, Calif.

[21] Appl. No.: 08/874,974

[22] Filed: Jun. 13, 1997

Related U.S. Application Data

[60] Provisional application No. 60/019,943, Jun. 14, 1996.

[51] Int. Cl.[7] .................................................. G06K 15/00
[52] U.S. Cl. ......................................... 358/1.18; 358/1.15
[58] Field of Search .................................... 395/101, 117, 395/114, 115; 705/2–6; 707/523, 530, 520, 522

[56] References Cited

U.S. PATENT DOCUMENTS 5,832,447  11/1998  Ricker et al. ................................ 705/2

*Primary Examiner*—Arthur G. Evans
*Attorney, Agent, or Firm*—Elliot B. Aronson

[57] ABSTRACT

A system for retrieving reports and for extracting selected fields from print data streams that may be modified by a non-technical user to provide for revisions in format and additions of new report formats without any need for programming or knowledge of printer code. An extraction database is provided that contains report format information for each of the report formats in use. The report format information includes one or more extraction fields for each report format and a print position associated with the extraction field indicating the position at which the extraction field is printed in the corresponding report format. A print data stream containing a number of reports is analyzed for the presence of a first report, and the report format information associated with the first report format is retrieved from the extraction database. The print data stream is then searched for a data field to be printed at the print position associated with the extraction field in the retrieved report format information, and the content of the data field is extracted. The system is updated to search for new data fields or to add revised report formats simply by updating the extraction database, which may be performed by a business user through a graphical user interface or menu system at a display terminal.

8 Claims, 8 Drawing Sheets

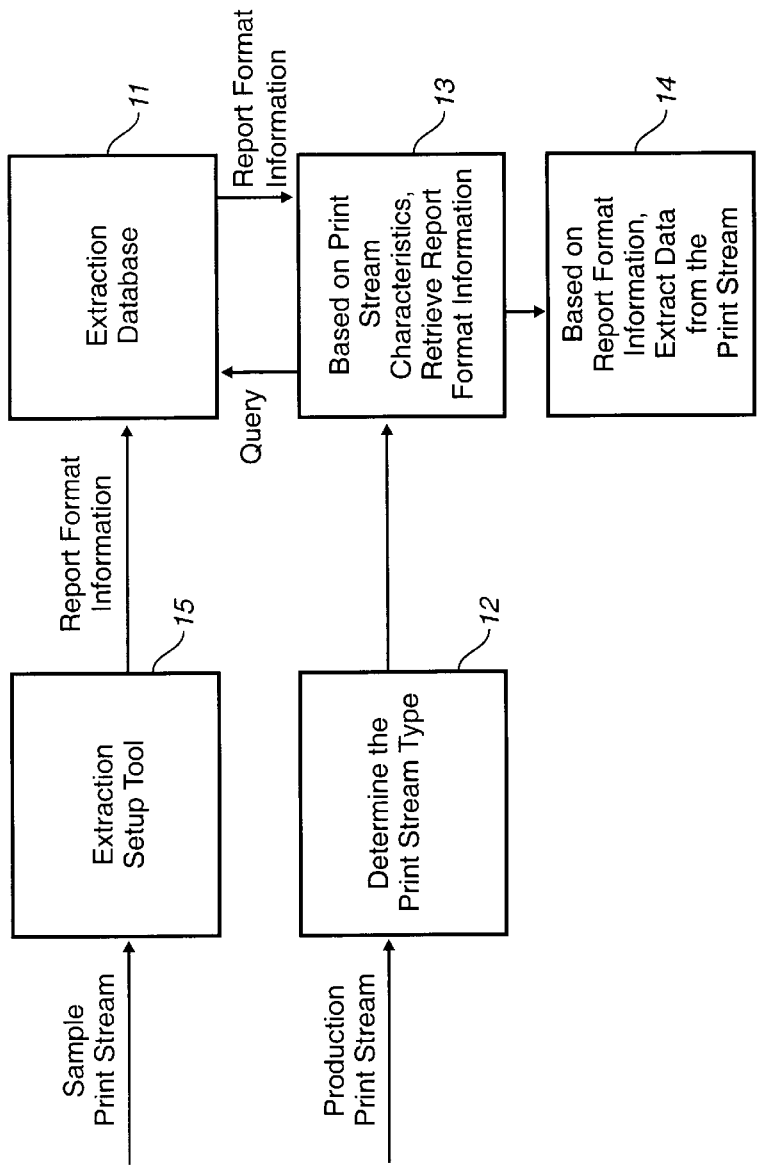
FIG._1
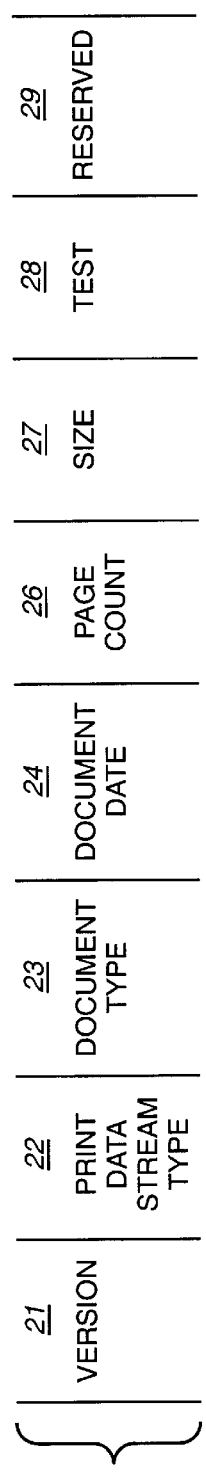
FIG._2B

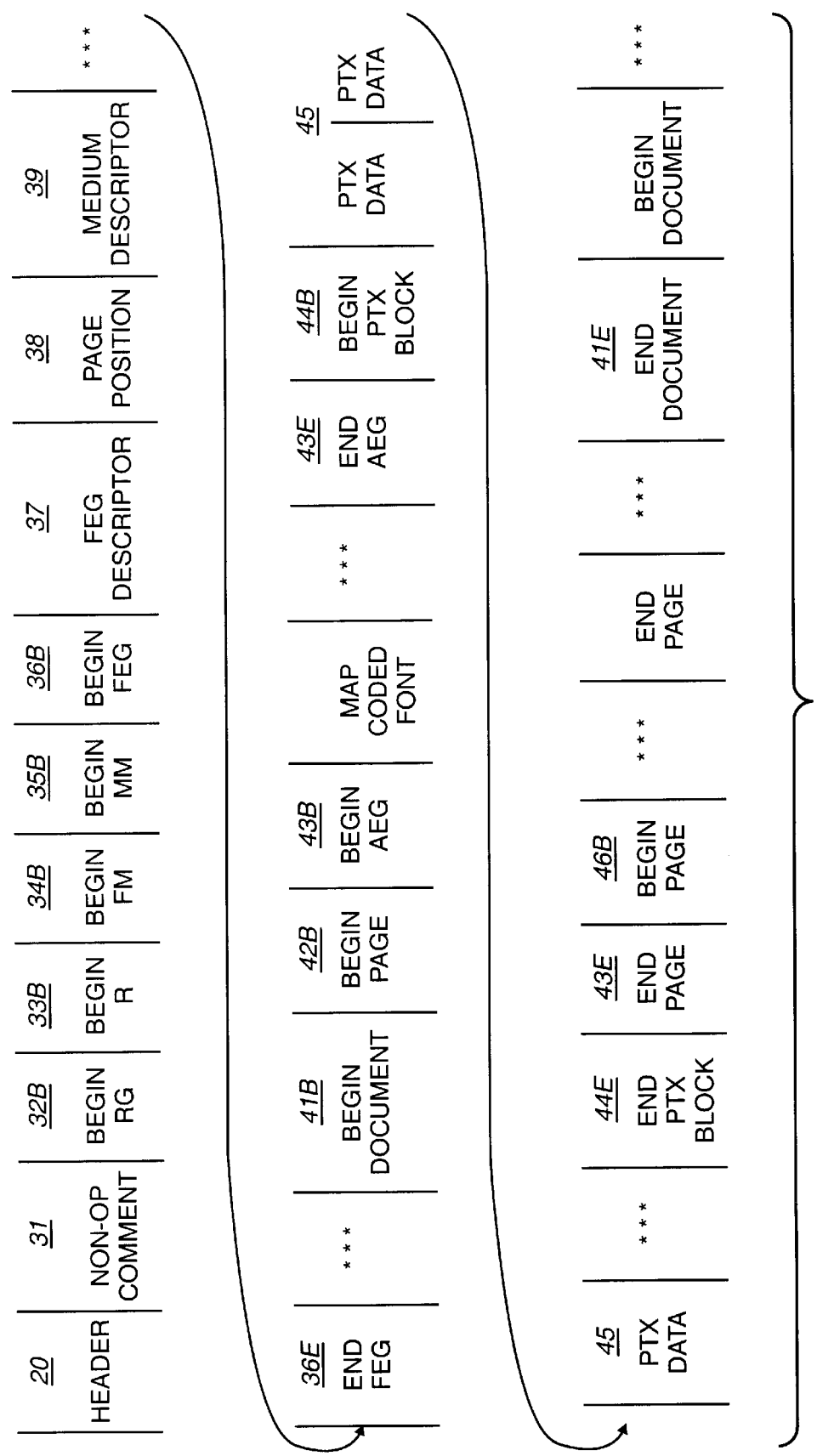
FIG._2A

FIG._3

| Account No. | Taxpayer No. | Page | Statement Period |
|---|---|---|---|
| 846-558-1123 | 555-55-5555 | 5 of 17 | 02/01/95 to 02/28/95 |

Howard Smith
11 Brandon Rd.
Anywhere, Cal 94666

— 51

Current Profile

...

— 52

Investment Activity

| | Date | Transaction | Description | Quantity | Price | Debit | Credit |
|---|---|---|---|---|---|---|---|
| SECURITY TRANSACTIONS | 02/02 | :SALE | UNITED HEALTHCARE CORP AGT ONLY NYSE 10 AV PX IS SHOWN PER YR AG PRICE 44.092000 | -8 | | | $352.72 |
| | 02/02 | PURCHASE | DIGITAL EQUIPMENT AGT ONLY NYSE 10 AV PX IS SHOWN PER YR AG PRICE 32.99500 | 14 | | $461.93 | |
| | 02/07 | STOCK DIVIDEND | HERCULES INC. HOLDING 10.0000 | 20 | | | |
| | 02/07 | :SALE | LYONDELL PETROCHEMICAL | -10 | | | $218.28 |

...

— 53

(55, 54 brace annotations)

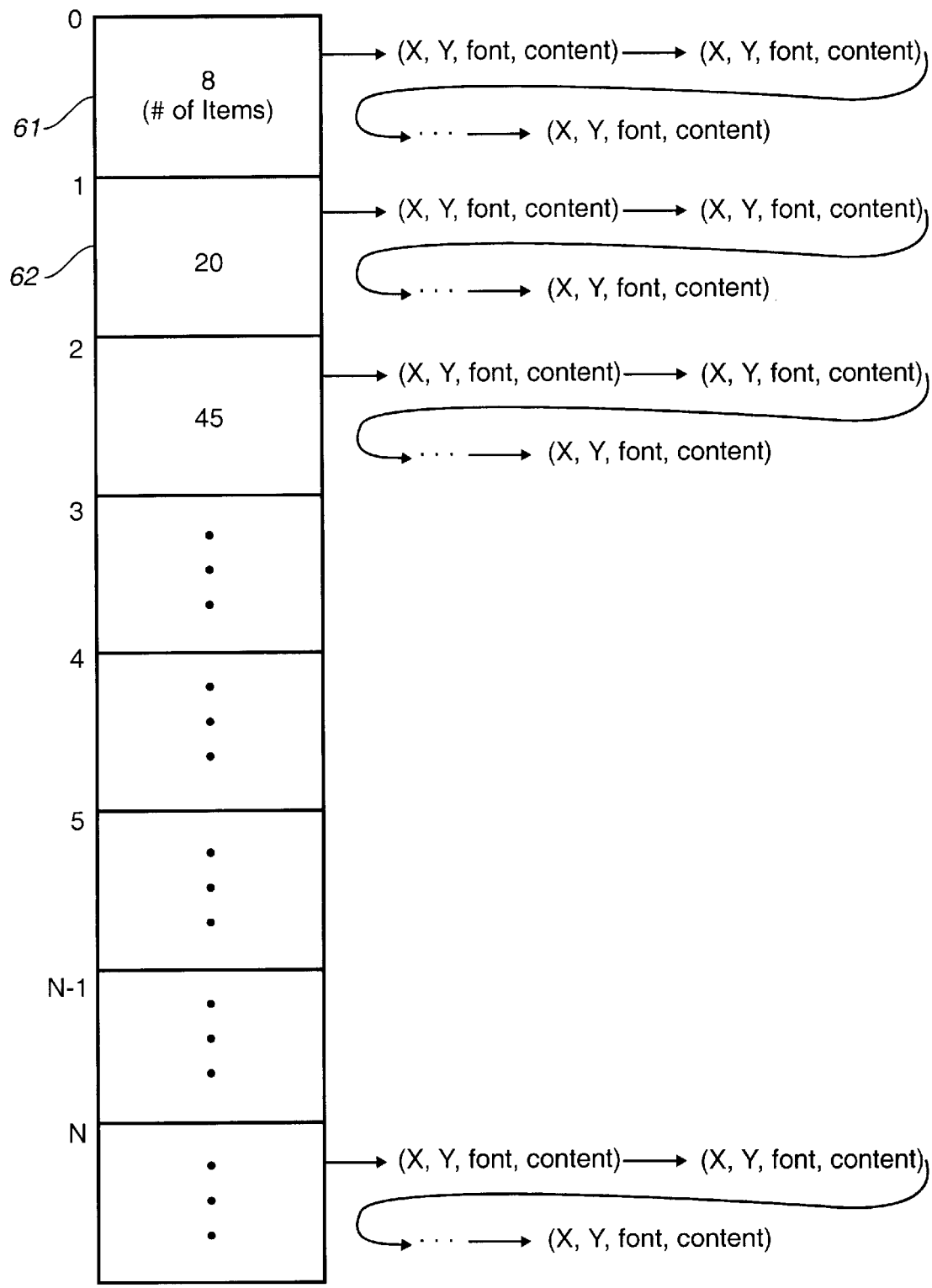
FIG._4

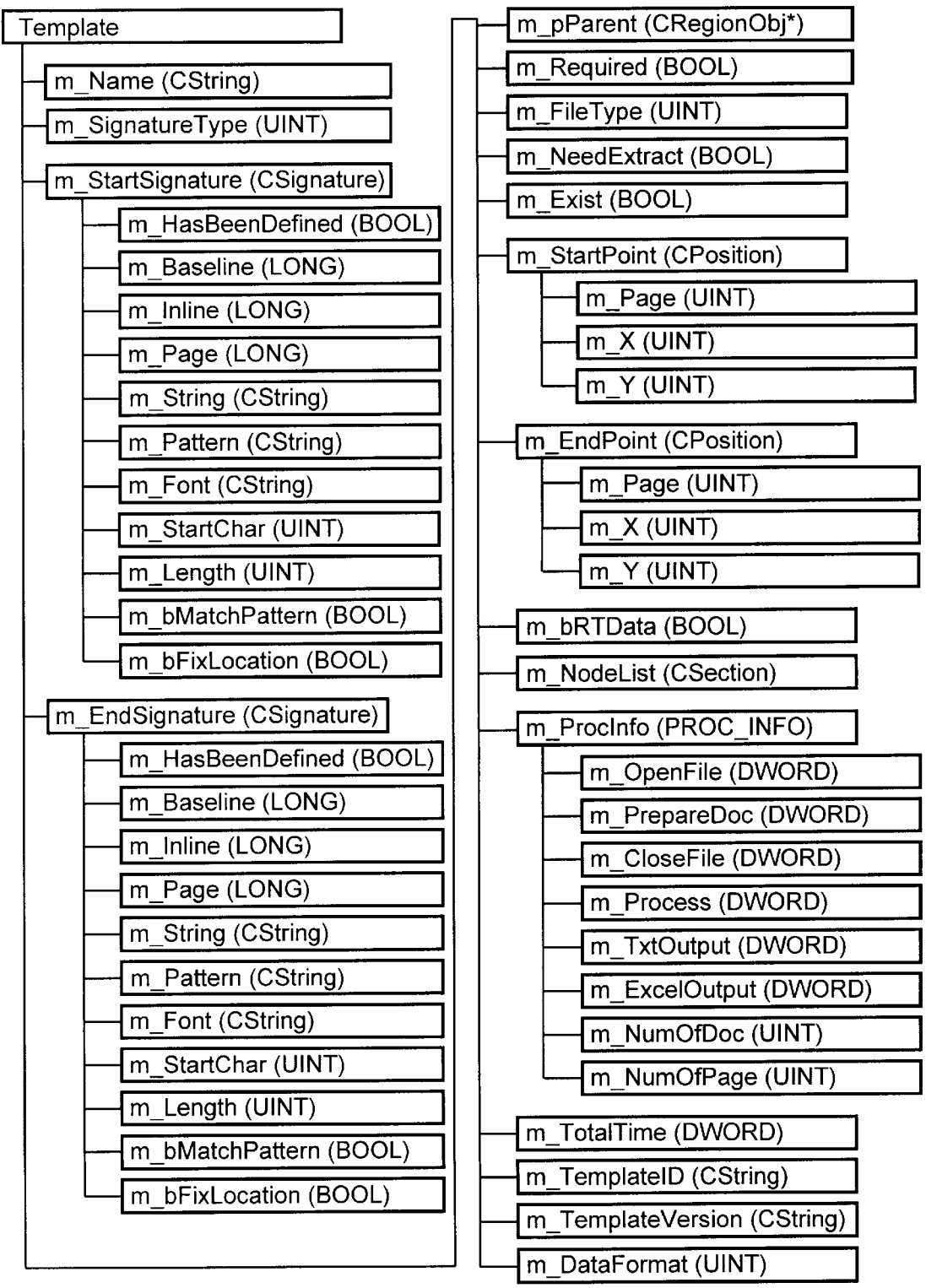
FIG._5A

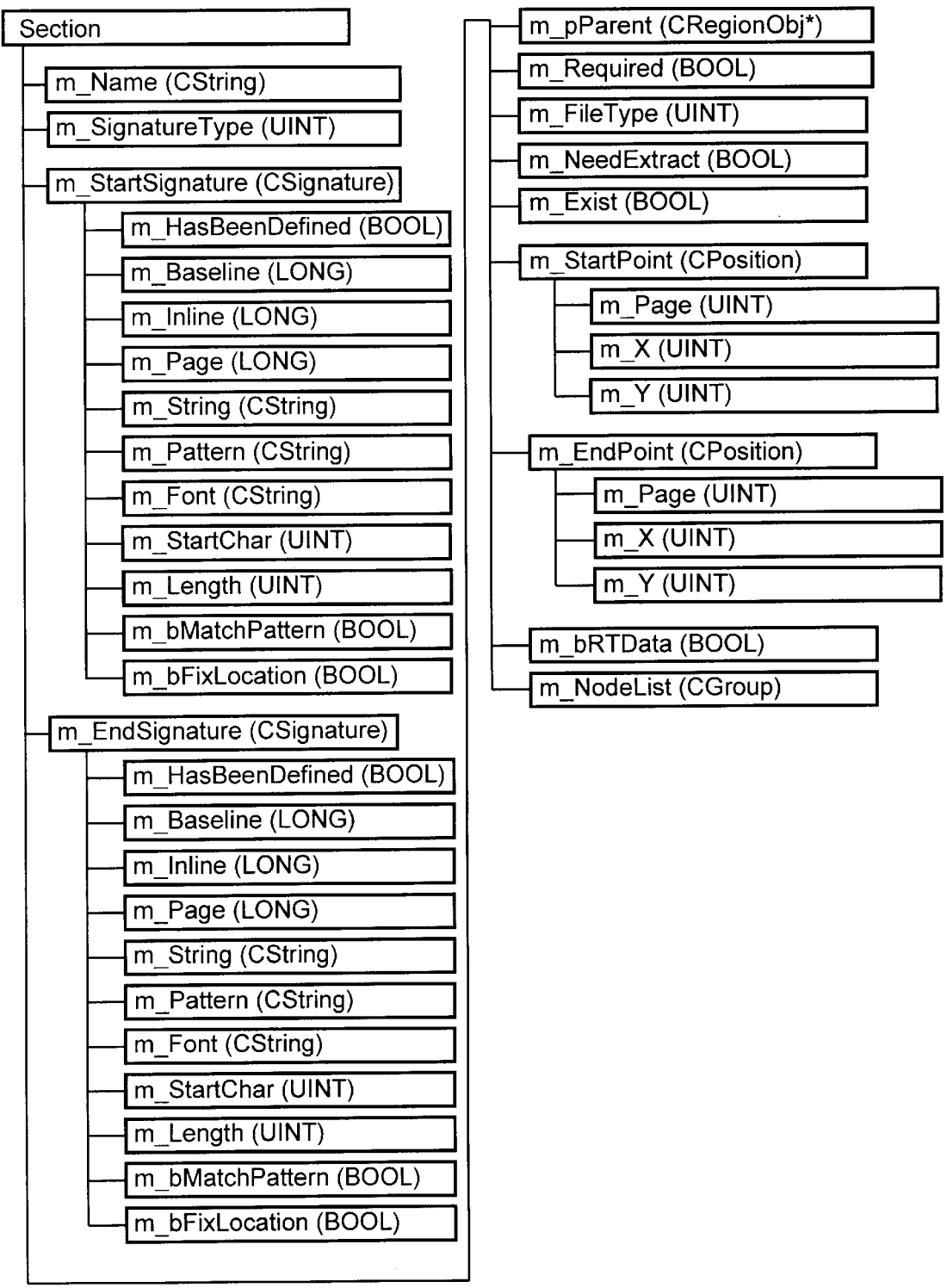
FIG._5B

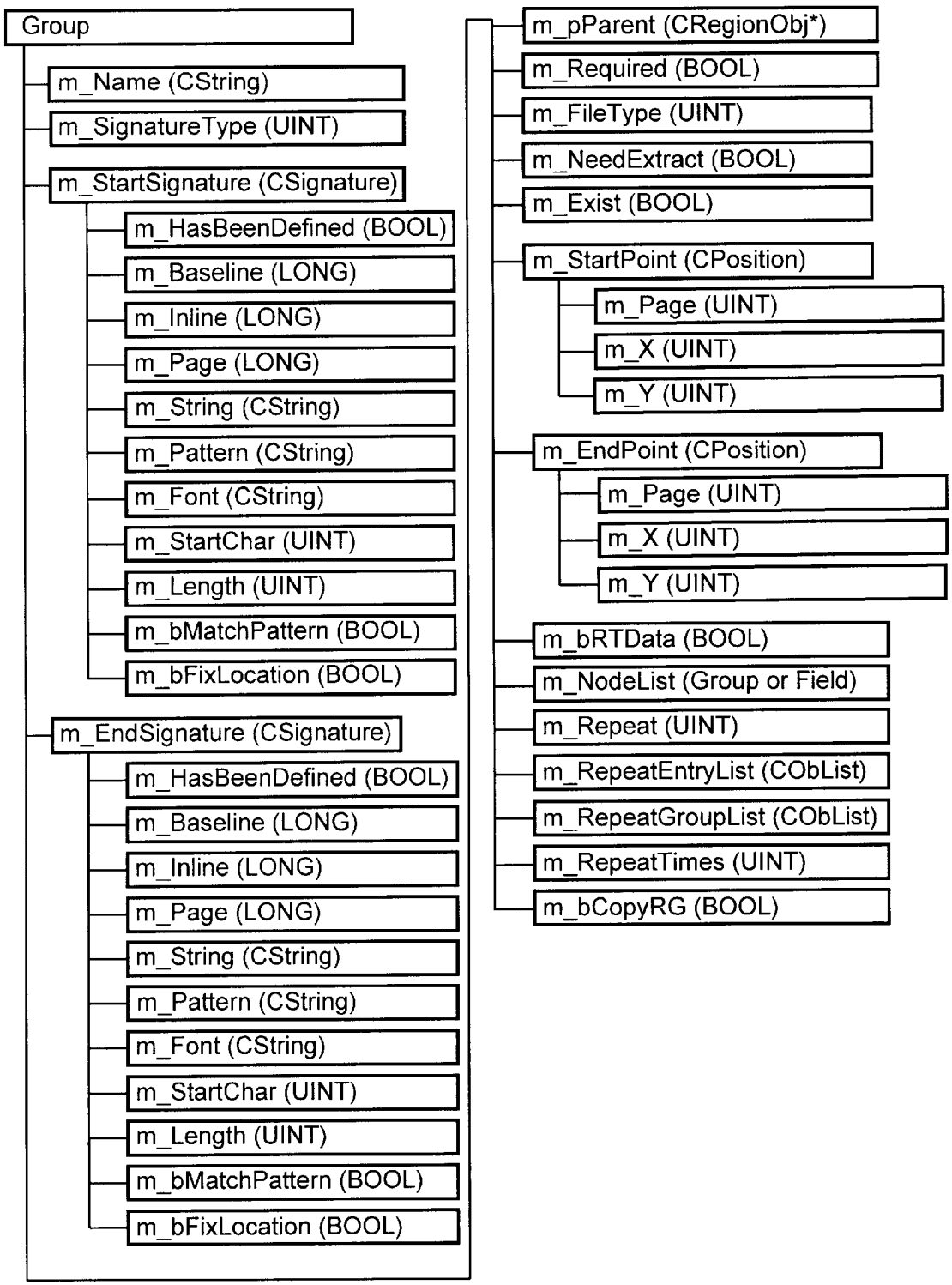
FIG._5C

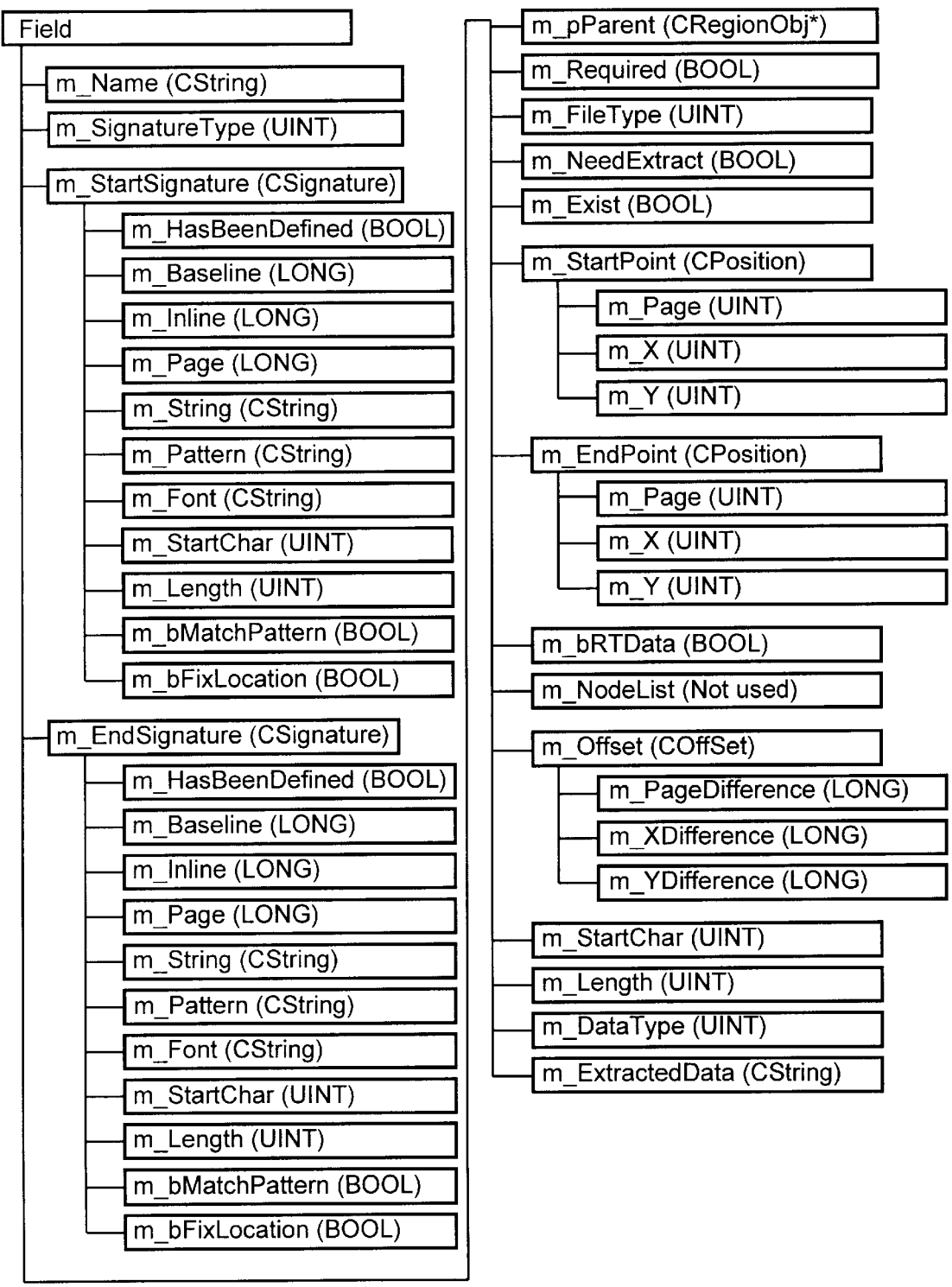
FIG._5D

SYSTEM FOR DATA EXTRACTION FROM A PRINT DATA STREAM

This application claims benefit of Provisional application 60/019,943 filed Jun. 14, 1996.

BACKGROUND OF THE INVENTION

The present invention relates to systems for retrieving information from archival storage and is more particularly directed to systems for retrieving data from print data streams.

The problem addressed by the present invention is illustrated by the familiar bank statement that every bank account holder receives every month. Banks are obligated to keep archival copies of all statements typically for a period of years, and many banks plan on holding archival copies much longer. An individual bank will generally have many thousands of account holders to whom it sends periodic statements. As a result, the bank's archives hold an extremely large number of statements.

The archives have traditionally been maintained on microfilm. More recently, optical disk systems have been devised for long-term archival storage. The microfilm stores a reduced photographic copy of the printed bank statement whereas the optical disk stores the coded information that was sent to the printer that printed the statement in the first instance.

When the archival records are kept on microfilm, whole statements are retrieved by reel and frame number (or fiche and frame number if micro fiche is used), and the microfilm is often coded with blip codes permitting specified statements or groups of statements to be located and retrieved automatically. In optical disk storage systems, a separate index database is maintained for retrieving statements from the optical disk. The computer searches the index database for statements cross indexed to a selected characteristic index field or fields such as the account number field to determine what to retrieve from the optical disk. Generally, special search and retrieval software has to be written to search the coded statement information for the desired characteristic index, and the desired index information has to be hard-coded into the software routine in advance. In addition, the software routine has to know the particular type of printer that was used so as to take into account the manner in which the desired characteristic will be encoded on the disk. The search and retrieval software generally has to be revised when the layout of the bank statements is changed or new fields are introduced into the bank statements. This requires the services of a highly trained computer programmer, which can be expensive, time-consuming and inconvenient just to bring into effect a simple revision in the form of a bank statement.

SUMMARY OF THE INVENTION

The present invention provides a flexible system for retrieving reports and for extracting particular fields from printer code information, sometimes referred to as a print data stream, that may be modified by a non-technical user to provide for revisions in format and additions of new report formats without any need for programming or knowledge of printer code. Briefly, an extraction database is provided that contains report format information for each of the report formats in use. The report format information includes at least one extraction field for each report format and a print position associated with the extraction field indicating the position at which the extraction field is printed in the corresponding report format. A print data stream containing a number of reports is analyzed for the presence of a first report, and the report format information associated with the first report format is retrieved from the extraction database. The print data stream is then searched for a data field to be printed at the print position associated with the extraction field in the retrieved report format information, and the content of the data field is extracted. The system is updated to search for new data fields or to add revised report formats simply by updating the extraction database, which may be performed by a business user through a graphical user interface or menu system at a display terminal.

Other aspects, advantages, and novel features of the invention are described below or will be readily apparent to those skilled in the art from the following specifications and drawings of illustrative embodiments.

BRIEF DESCRIPTION OF THE DRAWINGS

FIG. 1 is a logical block diagram showing the overall method of the invention.

FIG. 2A is a representative print data stream.

FIG. 2B is the header from the print data stream of FIG. 2A identifying the print data stream type.

FIG. 3 is a example of a page of a report showing the organization of data in the report for use with the invention.

FIG. 4 is a hash table used in the illustrated embodiment of the data extraction process.

FIGS. 5A–5D are object definition tables for use in the illustrated embodiment of the data extraction process.

DETAILED DESCRIPTION OF ILLUSTRATIVE EMBODIMENTS

The present invention is illustrated with reference to reports and statements common in the banking and investment industries, but may readily be applied to the processing of other types of statements and reports arising in a number of businesses and organizations, for example, account statements of any type sent to client account holders, reporting documents sent to outside agencies, inventory reports and other internal reporting and record keeping statements. The invention is thus not intended to be limited to use only with the statements as illustrated here. No distinction is made herein between statement and report.

FIG. 1 provides an overview of the manner in which a print data stream is processed according to the invention. FIG. 1 shows a production print data stream and a sample print data stream. The production print stream is the data stream intended to be sent to a printer in the ordinary course of business for printing documents. It may come directly from the document processing computer that generates the print stream in the first instance, or it may be retrieved from archival storage. It generally carries printer code for printing a plurality of reports that may have a number of different report formats. For example, in banking operations the production print data stream may contain the requisite coded information for printing a batch of bank account statements for the past month and may include statements to be sent to account holders for a variety of checking and savings accounts as well as internal financial reports for the bank's use. The production print data stream may alternatively contain coded information for printing a batch of reports all having the same report format. The sample print data stream is a smaller print data stream containing representative reports for use in devising data extraction templates as explained below.

The print data stream is itself a binary data stream of the type that is sent to a printer to produce the printed statements. The binary data stream encompasses the informational content to be printed in the statement as well as formatting codes, printer control codes, and may even include bit-mapped image data. "Print data stream" is used herein broadly to refer to a sequence of coded information of the type to be sent to a printer. The term may include an entire sequence to be sent to a printer in one or more print jobs, and it may include only a portion of a sequence to be sent to the printer.

Print data streams are written in one of several established languages, sometimes referred to as page description languages and referred to herein simply as print data stream types. Examples of such types include ASCII, several generations of the PCL language from Hewlett-Packard, the PostScript language from Adobe Systems, Inc., and the Advanced Function Presentation or AFP language from IBM. A large enterprise-wide computer system will generally include numerous printers sometimes requiring print data streams of different types, and the print data stream originating at any given time in any given department of the enterprise may thus be one of several different types.

Each report in the print data stream will have associated with it a report type, which indicates, for example, whether the report is a personal checking account statement, a business checking account statement, an investment account statement, or an internal activity report or some other category of report. Each report will include a number of fields for presenting information, such as account number, date, social security number, zip code of the account holder, and account balance, to mention only a few. In addition, each report type may be revised from time to time to change the layout of the report or to add further content-bearing fields. Thus, each report type will have associated with it one or more versions as such modifications to the report format take place. The format of a printed report, that is, the format of a report in the print data stream, will be determined once the report type and version are specified.

In the past, to retrieve selected data, such as the account number for all reports in the print data stream, it has generally been necessary to hard-code into the input software the location of the account number on the report so that the input software will know where in the print data stream to find the account number information. With the method of the present invention selected data may be retrieved from a print data stream, even after report formats are revised and new data fields are added, without revising any computer software code. As described below, the system may be updated to account for modified or entirely new report formats by an operator having no technical computer expertise or knowledge of programming. This is achieved in part by providing an extraction database 11 containing report format information for each of the report formats in use. The extraction database may be maintained and manipulated by a business user through a graphical user interface or menu system at a display terminal.

A description is now given of the manner in which a production print data stream is analyzed and processed. As indicated at block 12, the production print data steam is first analyzed to determine the print data stream type, that is, the type of printer language being used.

The print data stream is then analyzed at block 13 to determine the report type and the report version of the first report. First, the beginning of a first report in the print data stream is found. Methods for locating the beginning of reports or other files in a print data stream are well known. Typically, the print data stream will contain a code indicating the beginning of each report, or alternatively an algorithm may be applied to the print data stream to determine report beginnings.

Each report will typically be preceded by a file in the form of a header or a sequence of coded fields including data indicating the report type, which data may be found at a characteristic location in the header or sequence and so may be determined easily and automatically.

The report version is also ascertainable either directly or indirectly from the print data stream. The report version may be directly encoded in the report header or lead-in coded fields and may be retrieved directly along with the report type. Alternatively, the report may include other indicia from which the report version may be derived. For example, a report will often include a report date field. Where only one version of the report format is operative at a time, that is, different versions of the report format are not in use during the same date range, the report date may be used effectively to identify the report version. In this case, the report format information stored in the extraction database for this report type will associate each version with its operative date range. The print data stream is analyzed for the report date, which is compared with the date ranges included in the report format information for the given report type to find the report version. The manner of carrying out such comparisons is routine and need not be disclosed in detail here.

As indicated above, extraction database 11 contains report format information for each of the report formats that can arise in the print data stream. The report format information for a given report format includes a report type, a report version, and at least one extractable field. By extractable field is meant a content-bearing field that is present in the report format, the content of which a user may desire to extract from the print data stream. The extractable fields in the database are the fields of data that the present invention makes available to be extracted from the print data stream. In general, a plurality of extractable fields will be defined for each report format.

Each extractable field is printed at a prescribed print position in the corresponding report format, that is, in the corresponding version of a given report type. The print position may be a fixed position on the printed page, for example, a date field that is centered a set distance from the top of the page. In this case the print position may be specified, for example, by XY coordinates on the printed page. Alternatively the print position may be specified as a relative position, for example, an account balance that appears at prescribed coordinates with respect to the last entry in a column with a variable number of transactions. The report format information in the extraction database associates a print position with each extractable field indicating the position at which the extractable field is printed in the corresponding report format.

Once the report type of a report in the print data stream is known, the report format information can be retrieved from the extraction database and the report version can be determined. Each extractable field identified in the report format information for the given report type and version may then be sought in the print data stream. This is achieved by searching the print data stream for printer code for printing a data field at the print position associated with the desired extractable field in the retrieved report format information. As an example of a field printed at a fixed location, consider a date field beginning at given XY coordinates in the printed report, then the date field may be sought in the print data stream by searching for appropriate printer code that causes a field to be printed at the prescribed XY coordinates. The content of that field, that is, the information to be printed beginning at the prescribed XY coordinates, is then extracted (see block 14), and the system proceeds to search for the next desired extractable field.

If at some time the report format is revised so that the date appears at a different location on the printed page specified by new XY coordinates or perhaps now specified as a relative postion, then it is only necessary to revise the print position entry for the date field in the extraction database for the given report type and version. Similarly, if the format is revised to include new data fields, or if it is desired to search for and extract data fields that had not previously been designated, it is only necessary to add the fields with their associated print positions to the extraction database. The invention provides a convenient method for accomplishing this.

To define or update the extraction database, a sample print data stream is presented to an extraction setup module 15. The sample print data stream comprises a print data stream for a sample report or for several sample reports of different formats if more than one report format is to be added or updated in one session. Extraction setup module 15 searches the sample print data stream for all fields to be printed in the sample report (or in the first sample report if more than one report is included) in the same way as above by looking for print commands in the print data stream. Such fields constitute candidate fields for possible inclusion in the extraction database. The candidate fields are presented on a display monitor through a graphical user interface or through a menu system. The user then selects the fields to be included in the extraction database. Means by which a user can enter a selection are well known to designers of user interfaces for display terminals and need not be described in detail here. The user may also be given an opportunity to name the selected extractable fields. The selected field or fields are then stored together with their associated characteristic print positions (which are known from the sample print data stream) as extractable fields associated with the sample report format.

An example of a print data stream will now be examined in more detail. FIG. 2A shows a representation of a segment of a print data stream using the AFP page description language. An AFP print data stream includes a sequence of structured fields for presenting composite pages of text, image, graphic, and bar code data. The AFP data stream is divided into functional components, sometimes referred to as "objects" by those skilled in the AFP language. Each such object is a set of structured fields delineated by "Begin Object" and "End Object" fields. For example, the print data stream typically includes one or more resource objects, which are named collections of fields defining fonts, overlays, page segments and the like. An environment group object is a collection of font-mapping controls, positioning controls and descriptors associated with a page, overlay or data object. A document object may comprise a collection of pages and various data objects, such as presentation text data blocks, vector graphics, raster images and even bar codes, as well as references to resource objects. The available types of AFP objects and the syntax and use of the structured fields are well known to those skilled in the AFP language and need not be described here in any detail.

The print data stream of FIG. 2A begins with a header 20 that indicates the print data stream type. FIG. 2B shows an example structure for the print data stream header. The first field 21 of header 20 indicates the version of the header. The next field 22 indicates the print data stream type, in this case AFP. The next field 23 indicates the document type, that is, the report type as it is called above. The field 24 indicates the document or report date. Field 26 gives the page count in the following stream associated with the header. Field 27 gives the size in bytes. Field 28 is a check field used for integrity checking, and field 29 is a reserved field. In this example the report version is determined by the report date specified in field 24. Report versions are associated with date ranges for the dates report version was in use. Alternatively, header 20 may specify a report version number.

After header 20 in the print data stream of FIG. 2A is a non-operative comment field 31 followed by a series of nested objects used for general preparations before the specific document fields begin. These are shown here only by way of general background Fields 32B–36B are the Begin Object fields for the nested objects, which are respectively Resource Group (RG), Resource (R), Form Map (FM), Medium Map (MM), and Form Environment Group (FEG). Fields 37–39 are the first few fields of the Form Environment Group object. Field 36E is the End Object field for the nested FEG object. The other Begin Object fields also have corresponding End Object fields (not shown). Next comes a Begin Document field 41B indicating the beginning of the first report in the print data stream. Field 42B is a Begin Page field for the first page of the first report. Next comes an Active Environment Group (AEG) delineated by Begin AEG and End AEG fields 43B and 43E. The AEG object is used to set the fonts and other general matters for the current document. Field 44B denoted Begin PTX Block marks the beginning of the data, referred to as presentation text, that appears on the current page of the current report. The block is terminated by End PTX Block 44E. The actual data are presented in a series of PTX Data fields 45. Then comes an End Page field 42E followed by a Begin Page field 46B for the next page, and so on.

A description is now given of the manner in which the information in a report is organized for use in the present data extraction system. The information in a report of any given report type is organized according to a hierarchy of sections and groups. Each report type can have multiple sections. Each section can have multiple groups, and each group can have multiple subgroups. A group may be repeatable, meaning that the same group structure is repeated sequentially in the document as many times as needed to display the relevant data. The data displayed in a group appears in fields, and a group may have any number of fields. A section is a logical object that provides for the presentation of data in multiple columns. A section represents a list of physical pages having the same columnar layout, that is, a one-column pages, two-column pages, etc.

FIG. 3 shows a page from an example investment account report. This page includes several groups. A first high-level group 51 shown at the top of the page is the "account identification" group and includes several fields displaying client account information, page number and statement period. A second group 52 is the "current portfolio" group and represents a grouping of the various investments owned by the account holder. Group 53 is the "investment activity" group and lists the various transactions occurring during the statement period. These groups represent logical groupings of the data and may extend over multiple physical pages of the printed report.

The representative group structure is described in more detail with reference to the Investment Activity group 53, which is a high level group including further subgroups. At the next lower level this group includes a "Security Transactions" subgroup 54, which lists the transactions that occurred, and a "Dividends & Interest" subgroup, which separately lists the dividends and interest paid during the statement period. Only a portion of the Security Transactions group appears on the page shown in FIG. 3, and the Dividends & Interest group does not appear at all on that page. Within the Security Transactions group 54 there is a repeatable subgroup, referred to as the "Transactions" group. This group is repeated once for each transaction appearing in the Security Transactions group, and each instance of the transactions group is labeled with reference numeral 55 in FIG. 3. The Transactions group 55 includes the following fields: date, transaction, description, end description, quantity, price, debit and credit. The description field is compound. It includes a repeatable field that corresponds to one line of description. One can enter as many lines of description of the transaction as desired. Each line corresponds to a repeated instance of the repeatable description field. The "End description" field is not separately marked as such in FIG. 3. It is a non-repeatable field for entering share price information, and it is denoted by the "Price" indication at the end of the description section of each transaction.

The information in a report is organized in a hierarchy of groups to provide for faster data extraction. To extract information in a desired field from a print data stream, it is first necessary to locate the field in the print data stream. This process is made speedier by first locating the group in which the desired field is located and then locating the field within the group. For this purpose each group and each field is uniquely identified by a characteristic signature at the start of the group or at the end of the group or both. We refer herein generally to the "signature" of the group, meaning thereby that signature that is necessary to identify the group uniquely. For some groups "signature" will thus refer to the combination of both the beginning and ending signatures. The signature also identifies the location of the group.

The signature will generally involve a character string appearing in a group, although it may not be an extractable field. The signature takes the form of a prescribed alphabetic, alphanumeric or other character string or a pattern of characters, possibly including wild cards. The signature may also include coordinate locations (absolute or relative) for the start of the signature or may be defined by a combination of coordinates, character strings, pattern matching, or even font identification. For example, in FIG. 3 the signature for the Security Transactions group 54 may be taken as the string "SECURITY TRANSACTIONS" together with the X coordinate for the start of the string (i.e., the coordinate along a horizontal axis) and the font characteristics of the string. Including these extra characteristics helps to avoid confusion with the phrase "security transactions" appearing in another part of the report. In general, the definition of signatures is intended to be flexible and thus may include other distinguishing characteristics such as font type. As another example, the signature for the repeatable Transaction subgroup of the Security Transactions group is the combination of the format of the date field and the X coordinate of the date field. Thus, the Transactions group signature is the value of the X coordinate specifying the beginning of the Date column in FIG. 3 together with the pattern "number, number, slash, number, number." The signature defines the repeatable group uniquely even though multiple instances of the repeatable group will generally appear in the same report, all having the identical signature.

Within each group there are at least one and typically a number of extractable fields. These fields are defined by their location relative to the group signature. Thus, to find a desired extractable field in a print data stream it is necessary only to know the group to which the field belongs, to find the group signature in the print data stream, and to go to the desired field's location relative to the group signature.

To extract a selected field from a print data stream, the following preparatory steps are undertaken. First the print data stream is parsed to find the boundaries of all the reports in the data stream. This is a straightforward task in the illustrated embodiment because each report begins with a Begin Document tag 41B and ends with an End Document tag 41E as shown in FIG. 2A. Each report is then parsed to find each page of every report and each extractable field on each page. In the illustrated embodiment the pages of a report are delineated by Begin Page and End Page tags such as tags 42B and 42E in FIG. 2A, and the fields are found by their coordinate locations relative to the group signature. Methods for parsing AFP data streams are known in the art and AFP parsing software is commercially available.

A table is then compiled of all the extractable fields, with each entry in the table having the format (X, Y, font, content), where X, Y are the coordinates of a standard reference point for the field, for example, the lower left corner of the field. "Font" refers to the font in which the text data appear, and "content" refers to the extractable content of the field. That is to say, an extractable field may include standard headings or other characters such as the string "PRICE" in the End Description field in the Transactions group 55 in FIG. 3. "Content" refers to the data found in that portion of the field that has been designated as an extractable unit.

The extractable fields on each page are then organized in two ways by means of two hash tables. These are referred to as the X-hash table and the Y-hash table, and they sort the extractable fields on a page by their X and Y coordinates, respectively. By pre-sorting the text fields in this way, this technique limits the scope of searching and improves the performance of the information extraction process.

The hash alogrithm is as follows. Assume that the Y-axis of a page is divided into equally spaced intervals, for example, one inch or 72 points. This effectively partitions the page into horizontal bands of equal width with all locations in a band having Y-coordinates falling within the same division of the Y-axis. Extractable fields falling within the same band on the page are linked together in the same cell of the Y-hash table. A field falls in a band if its standard reference point, e.g., the upper left corner of the field, is located in the band. Similarly for the X-hash table, the X-axis of the page is divided into equally spaced intervals partitioning the page into vertical strips. Two fields falling in the same strip are linked to the same cell in the X-hash table.

FIG. 4 shows a representative hash table, which is oriented vertically to suggest the Y-hash table. The first cell 61 corresponds to extractable fields having standard reference points with Y-coordinates falling between 0 (the top of the page) and 1 (one inch down from the top). The next cell 62 corresponds to fields falling between one and two inches from the top. The fields within each cell are then linked in the order of their appearance on the page going from left to right (the increasing X-direction). If two or more fields in the cell (i.e., their reference points) have the same X-coordinate, then the higher fields are placed before the lower ones in the linked list. The hash tables contain pointers to the (X, Y, font, content) entries in the table compiled earlier of all the extractable fields. In FIG. 4 the numbers within the cells refer to the count of fields in the respective cells, and the linking of the fields in a cell is represented diagrammatically by the sequences of entries in the field table.

To successfully extract selected data from a print data stream according to the invention, an extraction database is needed that indicates the extractable fields available for each report type in the print data stream and specifies expressly or implicitly the print positions of those fields. The method of the present invention may be utilized, and advantages of the invention may be realized, no matter how the extraction database is provided. Nevertheless, a beneficial way of generating the extraction database is now described.

The extraction database is generated from a sample print data stream that contains a master report of a given type. The print data stream is examined to determine the layout of the hierarchical structure of the report in sections and groups and to identify all possible extractable fields in the report. The hierarchical structure is recorded in an internal form that is figuratively referred to as a template for the report type and is used for defining filters by which a non-technical user may select extractable fields to be parsed from a print data stream. All the needed information on the hierarchical structure of the report type is included in the report template, which is stored in the extraction database for future use.

The report template comprises a collection of objects that define the components of the hierarchical structure. FIGS. 5A–5D show object class definition tables for the report template and for the sections, groups and fields included in the report. The tables show the attributes that serve to define the object. The object classes have a number of attributes in common, and these appear first in the tables from m_Name through m_NodeList.

The various attributes are now discussed. In many cases the nature of the attribute will be apparent to those skilled in the art from the attribute name, for example, the first attribute m_Name, which is plainly a character string naming the object. m_SignatureType indicates whether the signature for the object comprises a beginning signature alone, an ending signature alone, or both together. m_StartSignature and m_EndSignature define the beginning and ending signatures. Since some objects may have only a beginning or ending signature, the variable m_HasBeenDefined indicates whether the corresponding signature has been defined for the object. m_Baseline and m_Inline refer to Baseline and Inline coordinates for the start of the signature. Baseline and Inline are the terms in common use in the AFP language for the Y-coordinate and X-coordinate. m_Page refers to the logical page on which the signature appears. m_String records a specific string that constitutes the signature when the signature is in fact a specific string. m_Pattern records a pattern that constitutes the signature. m_Font records a characteristic font for the signature when the signature is characterized by a font. m_StartChar is the signature starting character. m_Length is the length of the signature. m_bMatchPattern is a Boolean variable indicating whether a pattern is to be matched to determine the signature. m_bFixLocation is a Boolean variable indicating whether the signature is to be found in a fixed location.

m_pParent indicates the object that is the parent of the present object and serves to record the hierarchical links of the various objects constituting the template. This attribute is only used for the Section, Group and Field objects because a template object does not have a parent.

m_Required indicates whether the object is a required one. m_Required is always true for templates, but not necessarily for sections, groups or fields.

m_FileType indicates the print data stream type with which the object will be used, e.g., AFP.

m_NeedExtract is a Boolean variable indicating whether the object has been selected by a user to be extracted. This attribute is set directly for field objects when a user selects the corresponding field for extraction. The attribute is then automatically set for the parent objects of the field object. In the other direction a user may select a higher level object, for example, an entire group, and the m_NeedExtract variable will be set for the group and for all subgroups and fields contained in the group.

m_Exist indicates whether the object exists in any particular document.

m_StartPoint and m_EndPoint indicate the beginning and end points of the object in the document.

m_bRTData is used at run time to indicate whether a data extraction process may proceed from disk while another file is open without altering the open file.

m_NodeList is a list of all the objects underneath the current object in the hierarchy.

The above attributes are common to templates, sections, groups and fields as seen in FIGS. 5A–5B.

The following attributes are specific to the template object. m_ProcInfo keeps track of the time used for each stage of extraction. Each subattribute stores an elapsed time. For example, m_OpenFile refers to the time for which the print data stream (i.e., the print "file") is open. m_PrepareDoc refers to the time for which a document is prepared for extraction, e.g., time for which hash tables are prepared and other tests are run. m_Process refers to the time for which the system goes through the whole document to find the objects selected for extraction. m_TxtOutput and m_ExcelOutput identify the output format for the extracted results. They indicate whether the results are to be in the form of a text file or an Excel spreadsheet.

m_TotalTime refers to the total processing time.

m_TemplateID is used to identify the template in addition to the name. The name will generally be a mnemonic name often selected by a non-technical user unaware of other named templates. With a separate template ID, the name need not be a unique. The ID is typically assigned by the systemand will be unique.

m_DataFormat is an alternative attribute for specifying file or data type.

The following attributes are specific to the group object and are provided merely for convenience. They relate to the flexibility of the system to extract data from a print data stream on disk while a separate file is open. m_RepeatEntryList is used to indicate a repeatable group and repeats the extractable fields for the repeatable group. m_RepeatGroupList gives the real positions and real substructure of the instances of the repeatable groups. m_RepeatTimes gives the number of instances of the repeatable group.

The following attributes are specific to field objects. m_Offset gives the offset of a field from the group signature. m_StartChar indicates the character in the field from which extraction is begun. m_Length refers to the length of the string to be extracted. m_DataType is used to identify Excel spreadsheet output. m_ExtractedData is used to store the extracted data when a field has been selected for extraction.

As a preliminary step a technical user prepares a template for each version of each report type. The technical user examines a sample print data stream for each report type. This is conveniently performed graphically by displaying the sample report type on a display monitor. The user then identifies the areas of the report that are desired to be sections, groups and fields. For each identified group and section the user identifies an associated signature. The group and section boundaries are defined by successive signatures. When the user indicates that a group signature is in fixed position, the system automatically stores the fixed location in the appropriate attributes of the group object table. If the group signature is floating, i.e., the location of the group can vary depending on the content of the group, then the user specifies the characteristics of the signature, which will include one coordinate (X or Y), the match string or pattern, and the font. The specified signature characteristics are automatically entered into the appropriate attributes of the group object definition table. If a group is defined as floating, then all its subgroups and fields are automatically defined to be floating and signatures will have to be defined for all such subgroups and fields. During template definition the user identifies all the fields that are to be extractable. The location of each of these fields is recorded relative to the signature of the group to which the field belongs. These fields will serve as candidate fields that a non-technical user may later choose to select for extraction. The sample report used to define the template is preferably saved with the template.

Once a template for a report type and version has been defined, it may be used for extraction of data from a production print data stream. A non-technical user may select data for extraction by defining a filter based on the template. The user selects a report type and version and the system opens a copy of the appropriate template along with the sample report from which the template was generated. The extractable fields, groups and sections are presented to the user as candidate fields or areas to be extracted, and the user then selects the areas or individual fields of interest. The appropriate bits are then automatically set in the corresponding m_NeedExtract attribute for the object. Methods by which a user may select areas or fields on a graphic display such as reverse video, drop-down lists and the like are routine in the art and are not discussed in any detail here. The user will generally also have the option of specifying an output format for the extracted data. The template corresponding to the user's selections is then saved in the extraction database as a filter for use in the extraction process. The print data stream is examined and parsed using the hash algorithm described above to find the fields indicated in the filter.

It is contemplated that the present invention will be particularly useful to retrieve data from records such as printed statements that have been stored as a print data stream for a long duration. Over a long time period the form of the printed statements can be expected to change either in format or in number or type of content-bearing fields and thus the job of data extraction is made more complicated by the changing format and content of the stored records. Notwithstanding the origins of the present invention in the processing of large and varying archival print data streams, the method of the invention may nevertheless find useful application in processing non-archived print data streams, e.g., real-time and near real-time print data streams for purposes other than archival storage.

The above descriptions and drawings disclose illustrative embodiments of the invention. Given the benefit of this disclosure, those skilled in the art will appreciate that various modifications, alternate constructions, and equivalents may also be employed to achieve the advantages of the invention. Therefore, the invention is not to be limited to the above description and illustrations, but is to be defined by the following claims.

What is claimed is:

1. A method of extracting a selected data field from a print data stream, said print data stream including printer code for printing a plurality of reports having at least one of a plurality of report formats, said method comprising the steps of:

providing an extraction database including report format information for said at least one of said plurality of report formats, said report format information comprising at least one extractable field having a print position associated therewith indicating the position at which said at least one extractable field is printed in the corresponding report format;

presenting a print data stream;

analyzing said presented print data stream for the presence of a first report having a first report format;

retrieving from said extraction database the report format information associated with said first report format;

searching said print data stream for a data field to be printed at the print position associated with said at least one extractable field in the retrieved report format information; and extracting the content of said data field;

whereby the data fields available to be extracted from said print data stream may be updated by updating said extraction database.

2. The method of claim 1, wherein said report format information comprises a plurality of extractable fields and associated print positions, and said method further comprises the step of selecting at least one extractable field from said plurality of extractable fields, and said searching step comprises searching said print data stream for a data field to be printed at the print position associated with the selected extractable field.

3. The method of claim 1, wherein each of said plurality of reports has a report type and a report version and said report format information further comprises a report type having associated therewith at least one report version, said method comprising the substeps of:

analyzing said presented print data stream for the report type and the report version of said first report; and retrieving from said extraction database said print position of said at least one extractable field associated with the report type and report version of said first report.

4. The method of claim 3, wherein said printer code indicates a report date for each of said plurality of reports and said report format information further includes a date range associated with said at least one report version, said method further comprising the steps of:

analyzing said presented print data stream for the report date of said first report; and identifying in said extraction database the report version associated with the date range including the report date of said first report.

5. The method of claim 1, wherein said print data stream includes at least one print data stream type, and said method further includes the step of identifying said at least one print data stream type in said presented print data stream.

6. A method of defining an extraction database for use in extracting selected data fields from a print data stream, said print data stream including printer code for printing a plurality of reports having at least one of a plurality of report formats, said method comprising the steps of:

presenting a sample print data stream including printer code for a sample report having a sample report format, said sample report format including fields at characteristic print positions;

searching said sample print data stream for all fields to be printed in said sample report;

presenting said fields on a display monitor as candidate fields for inclusion in said extraction database;

providing means for a user to select at least one of said candidate fields as an extractable field;

storing the at least one candidate field selected by the user together with the associated characteristic print position as an extractable field associated with said sample report format, thereby to form said extraction database.

7. A method of preparing a document for data extraction comprising the steps of:

identifying in said document a plurality of groups of data;

assigning a characteristic signature to each group of said plurality;

recording the position of each said signature;

identifying at least one extractable field in each said group; and recording the position of each said extractable field relative to the signature of the respective group containing each said extractable field.

8. A method of locating a floating field in a print data stream, said floating field having a first fixed coordinate and floating in a second coordinate, comprising the steps of:

parsing said print data stream to find the coordinates of all text data fields included therein;

partitioning the X and Y-axes of each page in said print data stream into intervals;

defining an X-hash table and a Y-hash table for each page in said print data stream, said X-hash table including cells corresponding said X-axis partitions and said Y-hash table including cells corresponding said Y-axis partitions;

assigning each said text data field on a page to the X-hash table and Y-hash table for the page based on the cells containing the X and Y coordinates of said data field;

identifying the cell containing said fixed coordinate of said floating field; and searching only said identified cell for said floating field.

* * * * *